United States Patent [19]

Uchman

[11] Patent Number: 5,160,297
[45] Date of Patent: Nov. 3, 1992

[54] TRIPOD CONSTANT VELOCITY JOINT HAVING MULTIPLE COMPONENT ROLLERS

[75] Inventor: Frederick J. Uchman, Clarkston, Mich.

[73] Assignee: GKN Automotive, Inc., Auburn Hills, Mich.

[21] Appl. No.: 660,559

[22] Filed: Feb. 12, 1991

[51] Int. Cl.⁵ .............................................. F16D 3/26
[52] U.S. Cl. .................... 464/111; 464/122; 464/167
[58] Field of Search ............... 464/111, 122, 132, 167, 464/905; 384/568

[56] References Cited

U.S. PATENT DOCUMENTS

| | | | |
|---|---|---|---|
| 2,235,002 | 3/1941 | Anderson | 464/111 |
| 4,192,154 | 3/1980 | Nakamura et al. | 464/111 |
| 4,490,126 | 12/1984 | Orain | 464/111 |
| 4,729,670 | 3/1988 | Murphy et al. | 464/111 X |
| 4,768,990 | 9/1988 | Farrell et al. | 464/122 X |
| 4,768,994 | 9/1988 | Strenglein | 464/111 OR |
| 4,828,534 | 5/1989 | Orain | 464/111 |
| 4,830,516 | 5/1989 | Davenport et al. | 464/111 X |
| 4,840,600 | 6/1989 | White et al. | 464/111 |

Primary Examiner—Daniel P. Stodola
Assistant Examiner—Tony A. Gayoso
Attorney, Agent, or Firm—Harness, Dickey & Pierce

[57] ABSTRACT

A tripod constant velocity universal joint having an annular outer member, an inner member and three multiple component rollers. The interior surface of the outer member has three longitudinal lobes forming opposing pairs of parallel longitudinal guideways which are engaged by the multiple component rollers. The inner member is centrally positioned within the outer member and has three trunnions extending radially into the three longitudinal lobes. A multiple component roller is pivotally attached to each of the trunnions. Each multiple component roller has oppositely disposed pairs of elongated rollers, each of which engages an adjacent guideway that corresponds to its trunnion. The axis of rotation of the elongated rollers is substantially perpendicular to its adjacent guideway. Each elongated roller is mounted such that it can be axially displaced along its axis of rotation.

10 Claims, 2 Drawing Sheets

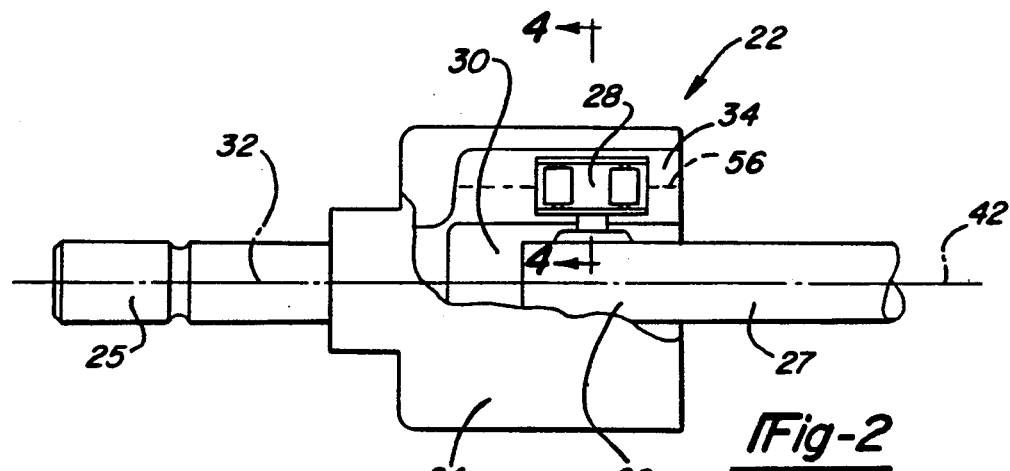
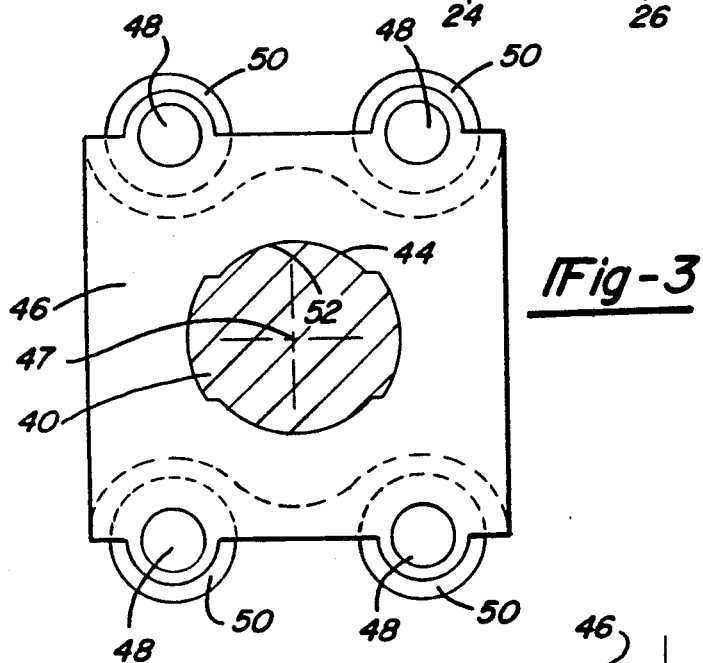
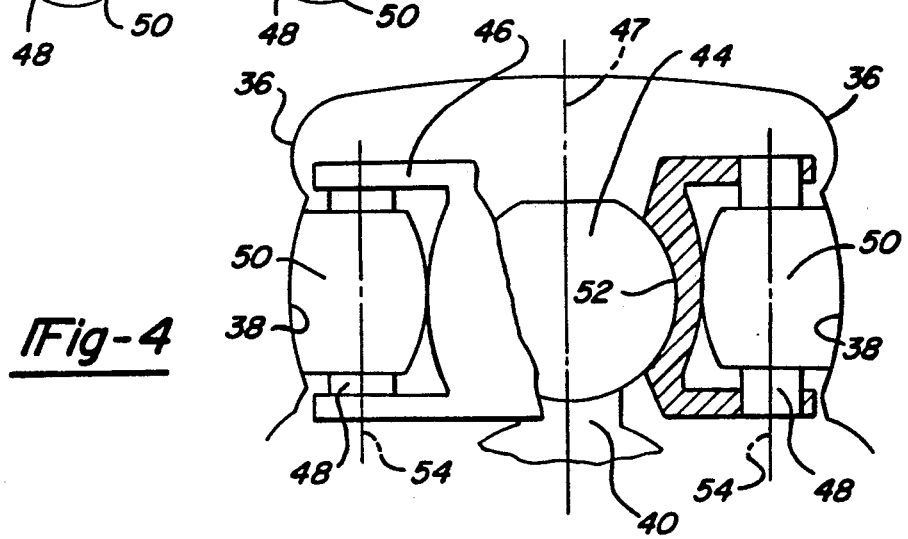

TRIPOD CONSTANT VELOCITY JOINT HAVING MULTIPLE COMPONENT ROLLERS

BACKGROUND OF THE INVENTION

1. Field of the Invention

The present invention generally relates to a constant velocity universal joint for transmitting a constant rotational motion between two non-coaxial shafts. More specifically, this invention related to a tripod constant velocity universal joint providing improved efficiency through lower friction within the joint while simultaneously allowing for high articulation and plunge between the shafts.

2. Description of the Prior Art

Constant velocity ("CV") universal joints are well known in the art and are extensively used to translate rotational motion between a driving shaft and a non-coaxial driven shaft. They are primarily desirable for their ability to deliver a uniform output rotational speed which does not vary with rotation of the drive linkage or with articulation between the driving and driven shafts. A typical example of such an application is the drive linkage between the transmission and front wheels of a front wheel drive car. Such linkages are not only required to have non-coaxial shafts between the transmission and the wheel for transmitting the engine power, but must also allow for extensive articulation between the drive shaft and the wheel for purposes of steering.

The tripod constant velocity joint of interest for purposes of the present invention is a particular form of the constant velocity classification of universal joints. Tripod CV joints generally have an inner joint member housed within an annular outer joint member. Conventionally, the inner joint member has three radially extending trunnions equally spaced about the inner joint's axis of rotation. Upon each trunnion is journaled a roller assembly which engages a pair of parallel longitudinal guideways or tracks correspondingly provided upon the interior surface of the outer joint member. By example, U.S. Pat. No. 2,235,002 to Anderson shows a tripod CV joint in which the trunnions are cylindrical and the rollers are slidably mounted on the trunnions to allow for radial movement of the roller relative to the trunnion when necessitated by the inner joint member being angularly disposed in relation to the outer joint member.

Anderson typifies the early tripod CV joint in which the plane of rotation of the roller remains parallel to the inner joint member's axis of rotation. As a consequence of the typical operating conditions where the axes of the inner and outer joint members are non-coaxial, each roller's plane of rotation is at some angle to the longitudinal axis of its guideway. As the CV joint rotates, each trunnion of the inner joint member arcuately traverses a portion of the length of its respective guideway. The portion of the guideway traversed increases as the angle between the inner and outer joint members increases.

At any distance from the midpoint of a guideway's length, each roller's plane of rotation is at an angle to the longitudinal axis of the guideway equal to the angle between the inner and outer joints. Therefore, at any time each of the three rollers is also at a different angle, corresponding to a phase angle of the CV joint's rotation, with respect to its respective guideways. Because the plane of rotation of a roller does not remain parallel to the longitudinal axis of its guideways, the motion of each roller relative to its corresponding pair of guideways is a combination of rolling and sliding.

This sliding motion results in an increase in friction between the roller and the guideways whose intensity increases depending upon the phase angle of the assembly's rotation. This periodic increase in friction induces high fluctuations in the torque resistance of the inner joint member as seen at the driving shaft, and consequently produces a non-uniform output speed to the inner joint member. Loss of efficiency results along with a destructive wear effect upon the member of the CV joint.

To minimize this "periodic" sliding component of the roller motion, attempts such as that shown by Anderson included forming the guideways to match the path of the roller. Anderson also provides rollers which were slidably mounted on the trunnions to allow for radial movement of the roller relative to the trunnion. However, it can be readily recognized that the expense and durability of the composite guideway of the Anderson design has significant disadvantages in precision and cost. In addition, the periodic sliding motion of the roller is only reduced and not sufficiently eliminated so as to avoid the aforementioned sliding.

U.S. Pat. No. 4,192,154 to Nakamura et al illustrates another method for reducing the periodic sliding motion between the rollers and the guideways. Nakamura retains the use of a roller which is radially slidable upon the trunnion, but in addition provides a second roller member which rotatably circumscribes the spherical outer surface of the first roller member journaled on the trunnion. The spherical inner surface of the second roller member allows for a degree of articulation between the first and second roller members, while the second roller member's cylindrical outer surface allows for a rolling motion as the roller assembly traverses the guideways of the outer joint member.

However, the rolling action of the Nakamura design is limited to one side only of the second roller member. The opposing side is a sliding motion at twice the linear speed of the translational speed of the second roller member. This "asymmetrical" sliding motion reduces the efficiency of the Nakamura CV joint.

A second approach to limiting the sliding action between the roller member and guideways is disclosed in U.S. Pat. Nos. 4,828,534 and 4,490,126 to Orain. There a triplan CV joint is provided whose roller member consists of a plurality of needle rollers disposed between the trunnions of the inner joint member and the guideways of the outer joint member. In U.S. Pat. No. 4,828,534, cups are provided between the spherical trunnions and the needle rollers. The inner surface of the cup is spherically concave so as to mate with the exterior spherical surface of the trunnion, whereas the outer surface of the cup is planar to provide a flat surface upon which the needle rollers traverse.

In contrast to Nakamura, this design avoids the asymmetrical rolling-sliding action of opposing sides of the rollers. However, as has been the disadvantage before, the periodic sliding motion between the rollers and their mating surfaces has not been eliminated. No axial or pivoting movement of either the roller or its mating surface is provided to reduce the degree of sliding sustained. U.S. Pat. No. 4,490,126 provides pivoting action of the planar surface. However, the pivoting of the planar itself induces a frictional drag that reduces the efficiency of the CV joint.

Another disadvantage to the Orain triplan joints is the limitation of the joint's plunge—the extent to which the drive and driven shafts can be angulated. The plunge of the disclosed triplan joints is limited by the length of the needle roller assembly. Once the planar surface has traversed the quantity of needles provided, the remainder of any required plunge will be limited to sliding of the planar surface upon the needles. Consequently, the efficiency of the CV joint is markedly reduced.

As can be seen from the above discussion, the prior art does not teach a tripod CV joint which simultaneously minimizes the periodic sliding action between the roller member and it mating surface while also avoiding the asymmetrical rolling-sliding condition. This common shortcoming of the prior art results in a reduced efficiency of the CV joint. Where one reference attempts to avoid the periodic sliding action by providing a slidable and pivotal rolling member, its efficiency is reduced by an additional asymmetrical sliding action on the opposing side of the rolling member. And where another reference attempts to avoid both the periodic and asymmetrical sliding action by providing a mating surface that pivots with the rolling member, its efficiency is still limited by the drag resulting from the pivot action of the mating surface.

Accordingly, what is needed is a tripod CV joint with the advantages of having a roller member that is both slidable with and rotatable about is corresponding trunnion in order to maintain the roller's plane of rotation parallel to the guideways, while also avoiding the asymmetrical sliding action between the roller member and its opposing mating surfaces. It would be additionally desirable to provide a tripod CV joint which can accommodate a high degree of angulation between the drive and driven shafts by providing for maximized plunge between the inner and outer joint members.

SUMMARY OF THE INVENTION

According to the present invention, a constant velocity universal joint is provided with an outer member, an inner member and predetermined number of multiple component rollers. The outer member has an internal cavity with a number of longitudinal lobes corresponding to the number of multiple component rollers. The longitudinal lobes are equally spaced from each other and in relation to the outer member's axis of rotation. Each longitudinal lobe forms a pair of opposing side walls which are generally parallel to each other. The side walls define pairs of parallel longitudinal guideways for the multiple component rollers.

The inner member is centrally positioned within the outer member and has an independent axis of rotation from that of the outer member. The inner member has a predetermined number of trunnions corresponding to the number of multiple component rollers and longitudinal lobes. The trunnions extend radially in relation to the inner member's axis of rotation, and each is positioned within a respective longitudinal lobe between a pair of longitudinal guideways.

Each of the multiple component rollers is individually and pivotally attached to a trunnion. The multiple component rollers include an oppositely disposed pair of elongated roller members, each of which engage one of the adjacent pair of longitudinal guideways that correspond to the trunnion upon which the multiple component roller is attached.

Each elongated rolling member has an axis of rotation perpendicular to the pair of adjacent longitudinal guideways. Each elongated rolling member is mounted to the multiple component roller such that it can be axially displaced along its axis of rotation. The elongated rolling members each engage its adjacent longitudinal guideway so that each opposing pair of elongated rolling members is engaged within an opposing pair of guideways.

Of particular importance for the purpose of the present invention is the ability of the elongated rolling member to be axially displaced along its axis of rotation. Under non-rotational conditions, as the angle between the inner and outer member's axes increases from zero, the radial depth that each trunnion is disposed within its corresponding longitudinal guideway decreases. This angular displacement of the trunnion with respect to its adjacent guideways necessitates a change in pitch of each multiple component roller with respect to it trunnion, as well as an axial movement of the elongated rolling member along its axis of rotation in order for each elongated rolling member to track linearly along the entire length of its guideway.

Under typical operational conditions, the inner member is required to rotate while its axis of rotation is at some variable angle to the axis of rotation of the outer member. As the outer member is rotated, each trunnion alternately and arcuately sweeps from one side of the midpoints of its corresponding guideways to the other side of the midpoints by an equal distance. During this sweep by the trunnion, the multiple component roller of the present invention is capable of gradually changing from an initial pitch relative to the trunnion, through an attitude normal to the trunnion, until it is at a final pitch which is the reverse of its initial pitch.

The angle of the multiple component roller's initial and final pitch with respect to the inner member's axis of rotation is equal to that of the inner member's axis of rotation with respect to the outer member's axis of rotation. In addition, as the angle between the inner and outer member's axis of rotation increases, the length of the guideway traversed by the trunnion and its multiple component roller assembly during one complete cycle also increases. Consequently, the greater the angle between the inner and outer members, the greater is the demand for a change in pitch of the multiple component roller and axial displacement of the roller member to remain linearly tracking on its guideway. In a preferred embodiment, the rolling member can traverse the entire length of its guideway along a linear path while the trunnion on which it is mounted makes an arcuate sweeping pass between its corresponding pair of guideways as dictated by the angle between the inner member's and outer member's axes of rotation. In this way, the plunge of the CV joint is not limited by the roller member but only by the length of the guideways.

According to a preferred aspect of this invention, an inventive feature is the ability of the rolling member to remain on a linear path upon the guideway in order to eliminate the aforementioned periodic sliding action of the prior art. The axial displacement required of the rolling member can be readily calculated by using the Pythagorean theorem based upon the radial distance between the inner joint's axis of rotation and the midpoint of the guideways, and the maximum angle between the inner and outer member's axes of rotation.

In addition, a significant advantage of the present invention is that the rolling member can be rotatably mounted to the trunnions of the inner member such that the only contact made with the outer surface of the rolling member is with its corresponding guideway. Thus, the aforementioned asymmetrical sliding is avoided.

Accordingly, it is an object of the present invention to provide a tripod CV joint which can operate with improved efficiency over the prior art.

It is a further object of this invention that such a tripod CV joint achieve lower internal friction by eliminating the periodic sliding action between the rollers and guideways that is often seen with other tripod CV joints.

It is still a further object of this invention to provide a rolling member that can pivot to maintain a pitch parallel to the longitudinal axis of its corresponding guideway.

It is yet another object of this invention to provide a rolling member that can be axially displaced along it axis of rotation to maintain a linear path on its guideway as the trunnion arcuately sweeps between its corresponding pair of guideways.

Other objects and advantages of this invention will be more apparent after a reading of the following detailed description taken in conjunction with the drawings provided.

BRIEF DESCRIPTION OF THE DRAWINGS

FIG. 2 is a partial cross-sectional view of a tripod CV joint in accordance with a preferred embodiment of this invention;

FIG. 3 is a partial cross-sectional top view of the tripod CV joint of FIG. 2;

FIG. 4 is a partial cross-sectional view along line 4—4 of the tripod CV joint of FIG. 2.

DETAILED DESCRIPTION OF THE PREFERRED EMBODIMENT

Figure 1:
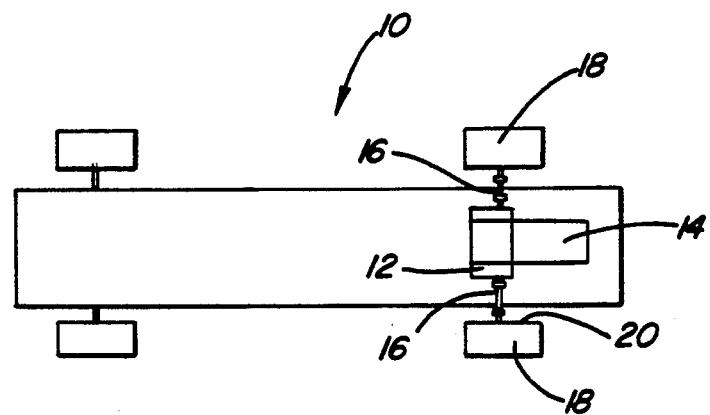
FIG. 1 is a diagrammatic representation of an operating environment which is a typical application for a tripod CV joint in accordance with a preferred embodiment of this invention.

FIG. 1 illustrates a typical operating environment which employs a tripod CV joint. A vehicle 10 is shown having a transmission 12 which is driven by a front-mounted engine 14. The transmission 12 drives a pair of half-shaft axles 16. The half-shaft axles 16 in turn drive their respective wheels 18. Use of some form of CV joint 20 is necessitated because the axis of the transmission 12 is not coaxial with the axes of the wheels 18. Utilization of the CV joint 20 ensures that the speed of each wheel 18 will be uniform and equal to the speed of its corresponding half-shaft axle 16.

In a preferred embodiment of this invention, a tripod CV joint 22, as shown in FIG. 2, has an annular outer member 24, an inner member 26, and three multiple component rollers 28. The outer member 24 is attached to a drive shaft 25 and has an internal cavity 30 which is coaxial with the drive axis of rotation 32 of the outer member 24. The internal cavity 30 has three longitudinal lobes 34 equally spaced about the drive axis of rotation 32, each of the longitudinal lobes 34 having a pair of opposing side walls 36, as best shown in FIG. 4. Each of the side walls 36 defines a longitudinal guideway to form a parallel pair of guideways 38.

The inner member 26 is attached to a driven shaft 27 and has three radially extending trunnions 40 equally spaced about a driven axis of rotation 42 of the inner member 26. A distal end 44 of each trunnion 40 is spherical in form. As shown, the inner member 26 is disposed within the internal cavity 30 of the outer member 24 and each of the trunnions 40 is disposed within a corresponding longitudinal lobe 34 between a pair of the guideways 38.

The multiple component roller 28 is journaled upon each trunnion 40 and simultaneously engages the pair of parallel guideways 38 adjacent its respective trunnion 40. As more clearly seen in FIGS. 3 and 4, each multiple component roller 28 includes a roller cage 46 pivotally circumscribing the trunnion 40, two pairs of oppositely disposed roller pins 48, and corresponding pairs of elongated rollers 50 rotatably mounted to the roller pins 48. The advantage of having two opposing pairs of roller pins 48 and elongated rollers 50 is the dynamic stability provided by having two elongated rollers 50 in contact with each guideway 38.

As can be better seen in FIG. 4, the roller cage 46 has a truncated spherical inner surface 52 corresponding to and mating with the spherical form of the distal end 44 of the trunnion 40. The mating spherical forms allow a large degree of pivoting motion between the multiple component rollers 28 and the trunnions 40. The roller pins 48 are rotatably attached to the roller cage 46 such that each roller pin 48 has a rolling axis of rotation 54 which is parallel to an axis of symmetry 47 of the roller cage 46 and transverse to its adjacent pair of guideways 38.

Figures 5A, 5B, 5C, 5D:
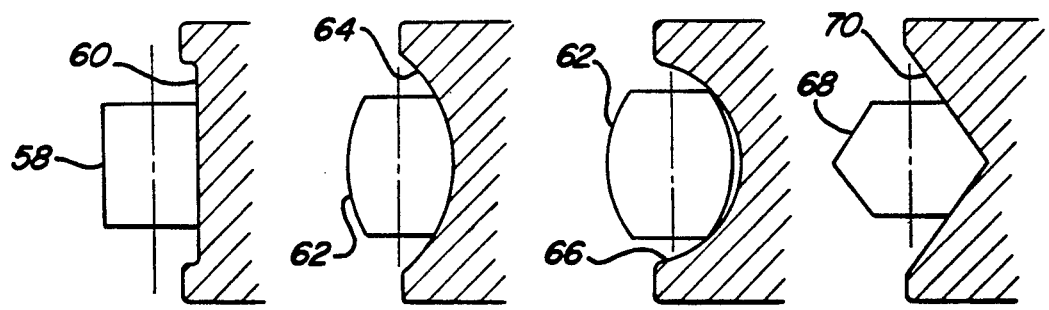
FIGS. 5-A through 5-D show various desirable forms of roller contours.

The elongated roller 50 is rotatably mounted to the roller pin 48 such that each elongated roller 50 engages its adjacent guideway 38. In the preferred embodiment, the elongated rollers 50 and the guideways 38 each have mating geometrical contours for promoting a uniform distribution of dynamic loading along the length of the elongated rollers 50. Mating geometrical contours also ensure that each elongated roller 50 will remain on a linear path 56 upon the guideway. As can be seen in FIGS. 5-A through 5-D, the contour of the elongated rollers 50 and guideways 38 can take various forms as desired, such as a cylindrically-shaped roller 58 and a flat guideway 60, as shown in FIG. 5-A, a spherically-shaped roller 62 and a mating concave guideway 64, as shown in FIG. 5-B, a spherically-shaped elongated roller 62, a non-mating concave guideway 66, as shown in FIG. 5-C, or a gothic-shaped elongated roller 68 received in a mating gothic-shaped guideway 70, as shown in FIG. 5-D.

Referring to FIGS. 2 and 4, a significant advantage of the tripod CV joint 22 of the present invention is the ability of the elongated rollers 50 to move axially along the length of the roller pins 48 as a result of the length of the roller pins 48 being longer than the elongated rollers 50. This mobility is required for the elongated rollers 50 to remain upon the linear path 56 of the guideway 38 during angulation between the outer member 24 and the inner member 26. As the angle between the drive axis of rotation 32 and driven axis of rotation 42 increases from zero, the radial depth that each trunnion 40 is disposed within its corresponding guideway 38 decreases. This angular displacement of the trunnion 40 with respect to its adjacent guideways 38 necessitates a change in the pitch angle of the multiple component roller 28 on the trunnion 40, and also an axial displacement of the elongated roller 50 relative to the roller pin 48 to maintain the elongated rollers 50 in the guideway 38.

Under operational conditions, the inner member 26 is forced to rotate while its driven axis of rotation 42 is at some variable angle to the drive axis of rotation 32 of the outer member 24. As the outer member 24 is rotated, each trunnion 40 alternately makes an arcuate sweep from one side of it corresponding guideways 38 to the other by an equal distance. During this arcuate sweep by the trunnion 40, the multiple component roller 28 will gradually change from its initial pitch relative to the trunnion, through an attitude normal to the trunnion 40, until it is at a final pitch with respect to the driven axis of rotation 42 is equal to the angle between the driven axis of rotation 42 and the drive axis of rotation 32.

According to a preferred aspect of this invention, an inventive feature is the ability of the elongated roller 50 to remain on the linear path 56 upon the guideway 38 in order to eliminate the aforementioned periodic sliding action of the prior art. To achieve this advantage, the elongated roller 50 is capable of moving axially with respect to its axis of rotation 54 as the trunnion 40 arcuately sweeps from one side of the guideway to the opposite side. The additional length of the roller pin 48 necessary to provide this axial displacement of the elongated roller 50 can be readily calculated by using the Pythagorean theorem based upon the radial distance between the driven axis of rotation 32 and the driven axis of rotation 42.

The periodic sliding between the elongated rollers 50 and the guideways 38 is also avoided by providing pivoting action between the roller cages 46 and the trunnions 40. This pivoting action allows for changes in the pitch of the multiple component rollers 28 such that the rolling axis of rotation 54 of the elongated rollers 50 remains substantially normal to the longitudinal axis of the guideway 38.

In addition, a significant advantage of the present invention is that the aforementioned asymmetric sliding action of the prior art is also avoided. To achieve this advantage, the elongated roller 50 is rotatably mounted to the roller pin 48 such that contact made with the outer surface of the elongated roller 50 is limited to the guideways 38. There is no opposing sliding action on the elongated rollers 50 diametrically opposite the contact of the elongated rollers 50 with the guideways 38.

Accordingly, the tripod CV joint 22 of the present invention provides operation having an improved efficiency over the prior art. The tripod CV joint 22 achieves lower internal friction by eliminating both the aforementioned periodic and the asymmetric sliding action of the elongated rollers 50 along the surface of the guideway 38.

While the invention has been described in terms of a preferred embodiment, it is apparent that other forms could be adopted by one skilled in the art. An example is providing alternate forms of rollers that still provide both the pivoting action and the axial displacement capability described of the present invention's multiple component rollers 28.

Accordingly, the scope of the invention is to be limited only the following claims.

What is claimed is:

1. A constant velocity universal joint comprising:
   an outer member having an internal cavity, said internal cavity having a plurality of longitudinal lobes equally spaced about a first axis of rotation, each of said plurality of longitudinal lobes having a pair of opposing side walls, each of said opposing side walls defining a longitudinal guideway;
   an inner member disposed within said outer member, said inner member having a second axis of rotation, said inner member having a plurality of trunnions corresponding to said plurality of longitudinal lobes, said plurality of trunnions extending radially in relation to said second axis of rotation, each of said plurality of trunnions being disposed within a respective one of said plurality of longitudinal lobes between said longitudinal guideways; and
   a plurality of multiple component rollers corresponding to said plurality of trunnions, each of said plurality of multiple component rollers being pivotally attached to a respective one of said plurality of trunnions each multiple component roller having at least one pair of rolling members rotatably attached to each of said plurality of multiple component rollers, each of said at least one pair of rolling members rotatably engaging one of said longitudinal guideways and having a rolling axis of rotation perpendicular to an adjacent one of said longitudinal guideways, each of said at least one pair of rolling members being capable of substantial axial displacement along said rolling axis of rotation such that each of said at least one pair of rolling members moves axially along said rolling axis of rotation and linearly traverses the length of said longitudinal guideways when said outer member is angularly displaced relative to said inner member.

2. A constant velocity universal joint as claimed in claim 1, wherein said plurality of longitudinal lobes comprises three longitudinal lobes, said plurality of trunnions comprises three trunnions, and said plurality of multiple component rollers comprises three multiple component rollers.

3. A constant velocity universal joint as claimed in claim 1, wherein said at least one pair of rolling members comprises two pairs of rolling members.

4. A constant velocity universal joint as claimed in claim 1, wherein each of said at least one pair of rolling members comprises an elongated roller rotatably mounted to a roller pin attached to said multiple component roller.

5. A constant velocity universal joint as claimed in claim 4, wherein each of said elongated rollers and each of said longitudinal guideways have similar geometrical contours for promoting a uniform distribution of dynamic loading along the length of said elongated roller.

6. A constant velocity universal joint as claimed in claim 1, wherein each of said plurality of multiple component rollers further comprises an annular roller cage pivotally attached to a respective one of said plurality of trunnions.

7. A constant velocity universal joint as claimed in claim 6, wherein each of said plurality of trunnions has a spherical end and said annular roller cage has a truncated spherical inner surface corresponding to and mating with said spherical end.

8. A tripod constant velocity universal joint comprising:
   an annular outer member having a drive axis of rotation and an internal cavity coaxial with said drive axis of rotation, said internal cavity having three longitudinal lobes equally spaced about said drive axis of rotation, each of said three longitudinal lobes having a pair of opposing said walls, defining opposing longitudinal guideways;

an inner member disposed within said internal cavity of said outer member, said inner member having a driven axis of rotation and three trunnions extending radially in relation to said driven axis of rotation, each of said three trunnions being disposed in a respective one of said three longitudinal lobes between said longitudinalguideways, each of said three trunnions having a spherical end; and three multiple component rollers, each multiple component roller of said three multiple component rollers pivotally attached to a respective one of said three-trunnions such that each of said multiple component rollers engage each of said longitudinal guideways, each of said multiple component rollers have an annular roller cage having an axis of symmetry and truncated spherical inner surface corresponding to and mating with one of said spherical ends, each annual roller cage have at least one roller pin attached thereof, said at least one roller pin defining a rolling axis of rotation substantially normal to an adjacent one of said longitudinal guideways, and an elongated roller rotatable mounted to said at least one roller pin, said elongated roller engaging said adjacent one of the said longitudinal guideways, said elongated roller being substantially shorter in length than said roller pin such that said elongated roller is substantially axially displaceable along said at least one roller pin to permit said elongated roller to linearly traverse the length of an adjacent one of said longitudinal guideways when said outer member is angularly displaced relative to said inner member.

9. A constant velocity universal joint as claimed in claim 8, wherein said at least one roller pin comprises two roller pins, said two roller pins being disposed on opposite sides of said annular roller cage, each roller pin of said two roller pins having an elongated roller rotatably mounted thereon such that each of said two elongated rollers engages an adjacent one of said longitudinal guideways.

10. A constant velocity universal joint as claimed in claim 8 wherein each of said elongated roller and each of said longitudinal guideways have similar geometrical contours for promoting a uniform distribution of dynamic loading along the length of said elongated rollers.

* * * * *